(12) United States Patent
Mackin et al.

(10) Patent No.: US 10,100,744 B2
(45) Date of Patent: Oct. 16, 2018

(54) AIRCRAFT BLEED AIR AND ENGINE STARTER SYSTEMS AND RELATED METHODS

(71) Applicant: The Boeing Company, Chicago, IL (US)

(72) Inventors: Steve G. Mackin, Bellevue, WA (US); David W. Foutch, Seattle, WA (US); Eric G. Landre, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 615 days.

(21) Appl. No.: 14/744,398

(22) Filed: Jun. 19, 2015

(65) Prior Publication Data
US 2016/0369705 A1    Dec. 22, 2016

(51) Int. Cl.
*F02C 7/27*  (2006.01)
*F02C 6/08*  (2006.01)

(52) U.S. Cl.
CPC ............... *F02C 7/27* (2013.01); *F02C 6/08* (2013.01); *Y02T 50/671* (2013.01)

(58) Field of Classification Search
CPC ...... F04D 27/00; F04D 27/005; F04D 27/009; F04D 27/0269; F04D 13/043;
(Continued)

(56) References Cited

U.S. PATENT DOCUMENTS

| 2,800,002 A | 7/1957 | Seed |
| 4,015,438 A | 4/1977 | Kinsell et al. |

(Continued)

FOREIGN PATENT DOCUMENTS

| CA | 2773229 | 5/2011 |
| CN | 102596719 | 7/2012 |

(Continued)

OTHER PUBLICATIONS

United Stated Patent and Trademark Office, "Restriction and/or Election Requirement," issued in connection with U.S. Appl. No. 14/242,493, dated Dec. 6, 2016, 9 pages.
(Continued)

*Primary Examiner* — Dwayne J White
*Assistant Examiner* — Su Htay
(74) *Attorney, Agent, or Firm* — Hanley, Flight & Zimmerman, LLC

(57) ABSTRACT

Example bleed air and engine starter systems are described herein that employ a shaft-driven compressor to start an aircraft engine and/or to supply pressurized air to one or more systems of an aircraft. An example compressor includes a housing and an impeller disposed within a cavity of the housing. The impeller is operatively coupled to a drive shaft. The compressor includes a first port in the housing to direct onto the impeller to rotate the impeller when the compressor is operating in a first mode. In the first mode, the impeller is to drive the drive shaft. The compressor also includes a second port in the housing oriented to provide air to the impeller when the impeller is operating in a second mode. In the second mode, the drive shaft is to rotate the impeller to draw the air from the first port and increase a pressure of the air.

19 Claims, 9 Drawing Sheets

(58) Field of Classification Search
CPC ...... F04D 25/045; F04D 15/0016; F02C 6/04; F02C 6/06; F02C 6/08; F02C 9/18
See application file for complete search history.

(56) References Cited

U.S. PATENT DOCUMENTS

| | | |
|---|---|---|
| 4,262,495 A | 4/1981 | Gupta et al. |
| 4,487,034 A | 12/1984 | Cronin et al. |
| 4,503,666 A | 3/1985 | Christoff |
| 4,684,081 A | 8/1987 | Cronin |
| 5,036,678 A | 8/1991 | Renninger et al. |
| 5,063,963 A | 11/1991 | Smith |
| 5,114,100 A | 5/1992 | Rudolph |
| 5,136,837 A | 8/1992 | Davison |
| 5,143,329 A | 9/1992 | Coffinberry |
| 5,363,641 A | 11/1994 | Dixon et al. |
| 5,414,992 A | 5/1995 | Glickstein |
| 5,524,848 A | 6/1996 | Ellsworth |
| 5,813,630 A | 9/1998 | Williams |
| 5,899,805 A | 5/1999 | Dowd et al. |
| 5,967,461 A | 10/1999 | Farrington |
| 6,189,324 B1 | 2/2001 | Williams et al. |
| 6,305,156 B1 | 10/2001 | Lui |
| 6,401,473 B1 | 6/2002 | Ng et al. |
| 6,415,595 B1 | 7/2002 | Wilmot, Jr. et al. |
| 6,491,254 B1 | 12/2002 | Walkinshaw et al. |
| 6,526,775 B1 | 3/2003 | Asfia et al. |
| 6,629,428 B1 | 10/2003 | Murry |
| 6,681,592 B1 | 1/2004 | Lents et al. |
| 6,688,558 B2 | 2/2004 | Breer et al. |
| 6,709,246 B2 * | 3/2004 | Boyd ............... F04D 25/084 417/423.1 |
| 6,796,131 B2 | 9/2004 | Sampson |
| 6,942,183 B2 | 9/2005 | Zywiak |
| 6,971,241 B2 | 12/2005 | Critchley et al. |
| 6,997,013 B2 | 2/2006 | Jones |
| 7,207,521 B2 | 4/2007 | Atkey et al. |
| 7,246,482 B2 | 7/2007 | Mahoney et al. |
| 7,467,524 B2 | 12/2008 | Brutscher et al. |
| 7,607,318 B2 | 10/2009 | Lui et al. |
| 7,618,008 B2 | 11/2009 | Scherer et al. |
| 7,727,057 B2 | 6/2010 | Beier et al. |
| 7,871,038 B2 | 1/2011 | Space et al. |
| 8,047,470 B2 | 11/2011 | Porte |
| 8,063,501 B2 | 11/2011 | Finney |
| 8,529,189 B2 | 9/2013 | Brown et al. |
| 8,769,962 B2 | 7/2014 | Glahn et al. |
| 8,955,794 B2 | 2/2015 | Mackin et al. |
| 8,967,528 B2 | 3/2015 | Mackin et al. |
| 9,163,562 B2 | 10/2015 | Suciu et al. |
| 9,416,677 B2 | 8/2016 | Munsell et al. |
| 9,765,700 B2 | 9/2017 | Mackin et al. |
| 9,835,050 B2 | 12/2017 | Marche |
| 9,879,610 B2 | 1/2018 | Moes |
| 2001/0032472 A1 | 10/2001 | Buchholz et al. |
| 2003/0005718 A1 | 1/2003 | Mitani et al. |
| 2003/0051492 A1 | 3/2003 | Hartenstein et al. |
| 2003/0177781 A1 | 9/2003 | Haas et al. |
| 2004/0172963 A1 | 9/2004 | Axe et al. |
| 2005/0051668 A1 | 3/2005 | Atkey et al. |
| 2006/0272313 A1 | 12/2006 | Eick et al. |
| 2008/0314060 A1 | 12/2008 | Parikh |
| 2009/0277445 A1 | 11/2009 | Markwart |
| 2009/0314002 A1 | 12/2009 | Libera et al. |
| 2010/0107594 A1 | 5/2010 | Coffinberry et al. |
| 2011/0107777 A1 | 5/2011 | Atkey et al. |
| 2012/0111022 A1 | 5/2012 | Dyer |
| 2012/0186267 A1 | 7/2012 | Coffinberry et al. |
| 2013/0098059 A1 | 4/2013 | Suciu et al. |
| 2013/0164115 A1 | 6/2013 | Sennoun |
| 2013/0187007 A1 | 7/2013 | Mackin et al. |
| 2013/0269374 A1 | 10/2013 | Kelnhofer |
| 2015/0121842 A1 | 5/2015 | Moes |
| 2015/0233291 A1 | 8/2015 | Pelagatti et al. |
| 2015/0275758 A1 | 10/2015 | Foutch et al. |
| 2015/0275769 A1 | 10/2015 | Foutch et al. |
| 2017/0268430 A1 | 9/2017 | Schwarz |
| 2017/0268431 A1 | 9/2017 | Schwarz |

FOREIGN PATENT DOCUMENTS

| | | |
|---|---|---|
| DE | 102006042584 | 3/2008 |
| EP | 2470425 | 7/2012 |
| JP | 2013510042 | 3/2013 |
| WO | 1999/20528 | 4/1999 |
| WO | 2000/37313 | 6/2000 |
| WO | 0123724 | 4/2001 |
| WO | 2007/093389 | 8/2007 |
| WO | 2011/056285 | 5/2011 |

OTHER PUBLICATIONS

United Stated Patent and Trademark Office, "Non-Final Office Action," issued in connection with U.S. Appl. No. 14/242,570, dated Dec. 16, 2016, 23 pages.

United States Patent and Trademark Office, "Non-Final Office Action," issued in connection with U.S. Appl. No. 14/242,493, dated Mar. 20, 2017, 63 pages.

United States Patent and Trademark Office, "Notice of Allowance and Fee(s) Due," issued in connection with U.S. Appl. No. 14/632,322, dated Apr. 17, 2017, 17 pages.

United States Patent and Trademark Office, "Non-Final Office Action," issued in connection with U.S. Appl. No. 14/632,322, dated Aug. 12, 2016, 21 pages.

United States Patent and Trademark Office, "Restriction and/or Election Requirement," issued in connection with U.S. Appl. No. 14/242,570, dated Nov. 2, 2016, 10 pages.

Communication Pursuant to Article 94(3) EPC, issued by the European Patent Office in connection with European Patent Application 13152433.2, dated Oct. 28, 2015, 4 pages.

14 C.F.R. Part 25.831 effective as of Jan. 21, 1997, last retrieved from http://www.airweb.faa.gov/Regulatory_and_Guidance_Library%5CrgFAR.nsf/0/E84799D57F7D41DF852566720051B01D?OpenDocument on Aug. 2, 2013, 3 pages.

Extended European Search Report, issued by the European Patent Office in connection with European Patent Application No. 14175279.0 dated Dec. 3, 2014, 9 pages.

Communication Under Rule 71(3) EPC, issued by the European Patent Office in connection with European Application No. 10 750 014.2-1753, dated Jun. 28, 2013, 5 pages.

International Search Report, issued by the International Searching Authority in connection with International Application No. PCT/US2010/047357, dated Dec. 3, 2010, 5 pages.

Written Opinion, issued by the International Searching Authority issued in connection with International Application No. PCT/US2010/047357, dated Dec. 3, 2010, 5 pages.

International Preliminary Report on Patentability, issued by the International Bureau in connection with International Application No. PCT/US2010/047357, dated May 8, 2012, 6 pages.

Office Action, issued by the United States Patent and Trademark Office in connection with U.S. Appl. No. 12/614,441, dated Apr. 26, 2013, 21 pages.

Office Action, issued by the United States Patent and Trademark Office in connection with U.S. Appl. No. 12/614,441, dated Jul. 3, 2014, 24 pages.

Final Rejection, issued by the United States Patent and Trademark Office in connection with U.S. Appl. No. 12/614,441, dated Jan. 3, 2014, 22 pages.

Advisory Action, issued by the United States Patent and Trademark Office in connection with U.S. Appl. No. 12/614,441, dated May 22, 2014, 3 pages.

Notice of Allowance and Fee(s) Due, issued by the United States Patent and Trademark Office in connection with U.S. Appl. No. 12/614,441, dated Dec. 5, 2014, 7 pages.

Restriction and/or Election Requirement, issued by the United States Patent and Trademark Office in connection with U.S. Appl. No. 13/357,293, dated Sep. 25, 2013, 5 pages.

(56) References Cited

OTHER PUBLICATIONS

Office Action, issued by the United States Patent and Trademark Office in connection with U.S. Appl. No. 13/357,293, dated Feb. 7, 2014, 9 pages.
Notice of Allowance and Fee(s) Due, issued by the United States Patent and Trademark Office in connection with U.S. Appl. No. 13/357,293, dated Sep. 30, 2014, 8 pages.
Office Action, issued by the United States Patent and Trademark Office in connection with U.S. Appl. No. 13/951,181, dated Apr. 16, 2014, 9 pages.
Notice of Allowance and Fee(s) Due, issued by the United States Patent and Trademark Office in connection with U.S. Appl. No. 13/951,181, dated Sep. 30, 2014, 14 pages.
U.S. Appl. No. 14/242,570 filed with the United States Patent and Trademark Office on Apr. 1, 2014, 49 pages. Provided as an NPL as the application has not yet published.
U.S. Appl. No. 14/244,493 filed with the United States Patent and Trademark Office on Apr. 1, 2014, 51 pages. Provided as an NPL as the application has not yet published.
United States Patent and Trademark Office, "Notice of Allowance and Fee(s) Due," issued in connection with U.S. Appl. No. 14/242,570, dated Jun. 28, 2017, 38 pages.
United States Patent and Trademark Office, "Notice of Allowance and/or Fees Due," issued in connection with U.S. Appl. No. 14/242,493, dated Apr. 4, 2018, 20 pages.

* cited by examiner

AIRCRAFT BLEED AIR AND ENGINE STARTER SYSTEMS AND RELATED METHODS

FIELD OF THE DISCLOSURE

This disclosure relates generally to aircraft and, more particularly, to aircraft bleed air and engine starter systems and related methods.

BACKGROUND

Commercial aircraft typically employ an environmental control system to pressurize a passenger cabin of the aircraft and/or thermal anti-icing systems to provide heated air for anti-icing applications. These systems are commonly powered with bleed air. As used herein, bleed air is defined as compressed air that is extracted from a compressor of a gas turbine engine of the aircraft. The bleed air is bled from a bleed port in a housing of the engine. However, bleed air pressures vary greatly with operating conditions such as, for example, engine speed, operating altitude, etc. To ensure the bleed air has sufficient pressure and/or temperature to power various systems of the aircraft, bleed air is often extracted from a higher stage of the compressor that provides bleed air having a pressure and/or temperature above that demanded by the various systems. Therefore, because the bleed air often exceeds a temperature and pressure thresholds of the aircraft systems, the bleed air is cooled and/or reduced in pressure prior to supplying the air to, for example, the ECS.

To reduce the bleed air temperature, commercial aircraft typically employ a heat exchanger (e.g., a precooler) through which bleed air passes and which is typically located on a pylon adjacent to the engine. A fan operated by the engine of the aircraft provides cool air to the precooler to cool the bleed air prior to supplying the bleed air to the systems of the aircraft. The fan air is often dumped overboard after flowing through the precooler. Thus, cooling the bleed air via the fan reduces the efficiency of the aircraft engine. Additionally, the precooler typically has a relatively large dimensional envelope, which adds extra weight and may require a fan air scoop and exhaust that produce drag. Thus, the relatively large dimensional envelope of the precooler can also affect the efficiency of the aircraft engine. To reduce the bleed air pressure, commercial aircraft typically employ one or more pressure regulating valves through which bleed air passes. Thus, a substantial amount of the energy spent by the engine to produce the bleed air is wasted when cooling the bleed air and/or reducing the pressure of the bleed air. This wasted energy results in greater fuel consumption.

Commercial aircraft that utilize gas turbine engines (e.g., turbo-jet engines) also typically include air turbine starters for starting each of the engines. An air turbine starter includes a turbine that operates to turn a shaft that is mechanically coupled to a drive shaft of the engine. High pressure air supplied by a ground cart or auxiliary power unit is provided to the air turbine starter, which rotates the turbine and causes the drive shaft of the engine to rotate. Bleed air systems and air turbine starter systems generally utilize a large amount of ducting and additional components (e.g., valves, connectors, etc) to operate the respective systems. As a result, these two systems generally add a significant amount of weight to an aircraft engine.

SUMMARY

An example compressor disclosed herein includes a housing and an impeller disposed within a cavity of the housing. The impeller is operatively coupled to a drive shaft. The example compressor includes a first port in the housing to direct onto the impeller to rotate the impeller when the compressor is operating in a first mode. In the first mode, the impeller is to drive the drive shaft. The example compressor also includes a second port in the housing oriented to provide air to the impeller when the impeller is operating in a second mode. In the second mode, the drive shaft is to rotate the impeller to draw the air from the first port and increase a pressure of the air.

An example apparatus disclosed herein includes a compressor having a compressor inlet and a compressor outlet. The compressor is operatively coupled to an engine of an aircraft via a drive shaft. The example apparatus includes a first conduit to fluidly couple a low-pressure bleed air port from the engine to the compressor inlet, a second conduit to fluidly couple the compressor outlet to a system of the aircraft to receive pressurized air and a third conduit to fluidly couple a high pressure air source to the compressor. The compressor is to be driven by the drive shaft during a first operation, and the compressor is to drive the drive shaft during a second operation.

An example method disclosed herein includes directing high pressure air into a compressor to rotate an impeller in a housing of the compressor during a first operation. The impeller is operatively coupled to an aircraft engine via a drive shaft. The compressor has a compressor inlet and a compressor outlet. The example method also includes directing low pressure air into the compressor inlet of the compressor during a second operation. The impeller is to be driven by the aircraft engine during the second operation to increase a pressure of the low pressure air to a higher pressure at the compressor outlet.

BRIEF DESCRIPTION OF THE DRAWINGS

FIG. 2 shows an example air flow path during a first operation in which power is supplied to the example compressor to increase the pressure of bleed air.

Figure 1:
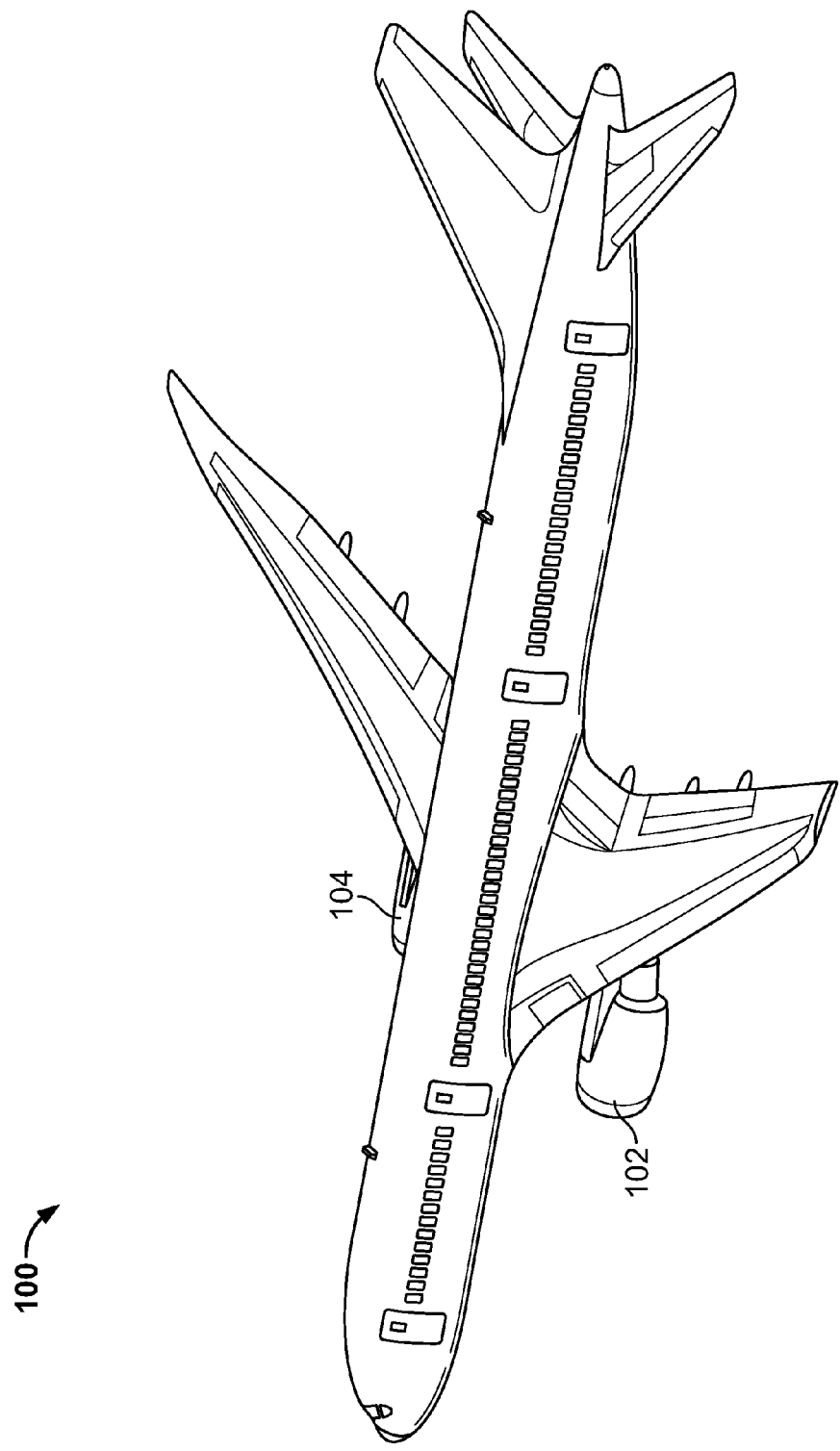
FIG. 1 is an illustration of an example aircraft that may embody the examples described herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example bleed air and engine starter systems and related methods that employ a shaft-driven compressor that may be used to start an aircraft engine and/or to supply compressed or pressurized air (e.g., bleed air) to one or more systems of an aircraft. The systems may include, for example, an ECS, a thermal anti-icing system (e.g., a wing and/or engine anti-icing system), a pneumatic supply system (to supply pneumatic devices), and/or any other system of the aircraft that uses compressed air. As a result, less energy is used by the example bleed air and engine starter systems during a significant number of flight conditions. Thus, the example bleed air and engine starter systems disclosed reduce bleed air energy waste and thereby improve the efficiency of the engine. Additionally, the example bleed air and engine starter systems utilize less ducting and components (e.g., a separate air turbine starter) than known systems to start an aircraft engine and to supply sufficient bleed air throughout a flight.

In general, when the compressor is operated in a first mode to supply pressurized bleed air, the engine drives the compressor to increase the air velocity and/or pressure of the bleed air. When the compressor is operated in a second mode to start an engine, the compressor receives high pressure air from a high pressure air source such as a ground cart or an auxiliary power unit (APU) that is converted by an impeller of the compressor into torque to start the engine. In other words, in the second mode the compressor operates as a blower or turbine to start the engine. To generate sufficient torque to start the engine, the example compressor includes an auxiliary inlet port that ducts high pressure air to a manifold that includes a plurality of nozzles surrounding the impeller. The nozzles are aligned to direct the high pressure air onto the blades of the impeller (e.g., at a location where the blade height is relatively larger). As a result, the air impinges on the blades where more surface area is available, thereby generating greater force to rotate the impeller. The impeller, which is coupled to the engine via one or more radial drive shafts and/or a gearbox, drives the drive shaft of the engine. Once the engine is rotating at a predetermined speed, fuel is injected into a combustion chamber and ignited, and the engine start cycle is completed.

To enable the compressor to operate in both the first and second modes, the compressor includes a gearbox having a reverse gear installed therein. When the reverse gear is in a first position, i.e. the engine start position, the compressor drives the engine. When the reverse gear is in a second position, i.e. the bleed air position, the engine drives the compressor to generate compressed air.

In regards to providing pressurized bleed air, the example bleed air and engine starter systems increase the pressure of bleed air that has already been at least partially compressed or pressurized by the compressor(s) of the engine and, thus, less energy is used by the shaft-driven compressor to boost the bleed air to the pressure demanded by the systems of the aircraft. Therefore, employing the shaft-driven compressor disclosed herein significantly reduces an amount of high-pressure bleed air (or bleed air having relatively higher pressure) that may be needed to satisfy the demand of an aircraft environmental control system. More specifically, the example shaft-driven compressor may provide compressed or pressurized air having a relatively lower pressure and/or temperature to power the systems of the aircraft. The shaft-driven compressor may receive bleed air discharged from one or more bleed ports on the engine. For example, the compressor may receive bleed air from a first a first low-pressure bleed port (e.g., at the entrance of a high pressure compressor) and/or a second low-pressure bleed port (e.g., at a fifth or mid-stage of the high pressure compressor). Depending on the operating condition of the aircraft engine and/or the demand of the systems of the aircraft, the compressor may received bleed air from either port to more efficiently utilize the bleed air from the aircraft engine. Additionally, by using the compressor to increase the pressure of the bleed air to meet the demands of the systems, less energy in the bleed air is wasted (e.g., by use of a precooler or pressure regulating valve), which significantly reduces the specific fuel consumption of the engine.

In some examples, engine bleed air discharged by the gas turbine engine may be used to supplement the pressurized bleed air generated by the compressor to provide compressed or pressurized air to the various aircraft systems during certain operating conditions. Additionally, using an engine bleed air system provides redundancy for the compressor. In other words, if the compressor is inoperable, the engine bleed air system is capable of providing bleed air to the systems of the aircraft, and vice versa.

Furthermore, the example configurations disclosed herein to implement the example shaft-driven compressor as an engine starter may similarly be used with one or more of the bleed air systems disclosed in U.S. patent application Ser. No. 14/242,570 filed Apr. 1, 2014, entitled "BLEED AIR SYSTEMS FOR USE WITH AIRCRAFTS AND RELATED METHODS," and U.S. patent application Ser. No. 14/242,493 filed Apr. 1, 2014, entitled "BLEED AIR SYSTEMS FOR USE WITH AIRCRAFTS AND RELATED METHODS," both of which are incorporated herein by reference in their entireties.

FIG. 1 illustrates an example aircraft 100 having aircraft engines 102, 104 (e.g., turbofan engines) that may embody aspects of the teachings of this disclosure. Each engine 102, 104 of the aircraft 100 may employ an example bleed air and engine starter system as disclosed in further detail herein. The bleed air and engine starter systems provide compressed or pressurized air to an aircraft system such as, for example, an ECS and/or a thermal anti-icing system (e.g., an engine and/or wing anti-icing system). The bleed air and engine starter systems may be utilized to start the respective engines 102, 104.

Figure 2:
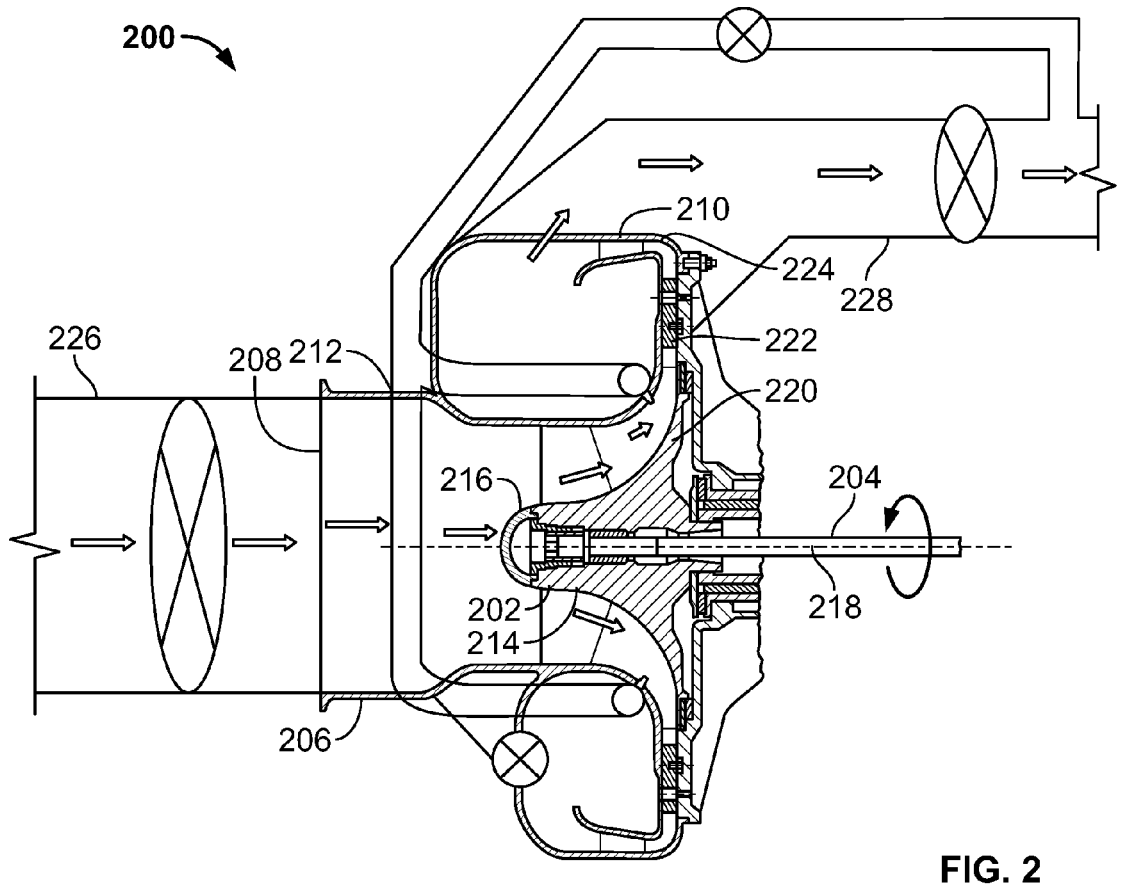
FIG. 2 is a cross-sectional view of an example compressor that may be implemented to supply bleed air to aircraft systems and/or start an aircraft engine.

FIG. 2 shows a cross-sectional view of an example shaft-driven compressor 200 used to provide pressurized air (e.g., bleed air) to one or more systems of the aircraft 100 (FIG. 1) and/or start an aircraft engine (e.g., the aircraft engine 102 of FIG. 1). While the example shaft-driven compressor 200 is referred to as a compressor, it is to be understood that the compressor may operate as a compressor or a starter. The example compressor 200 may instead be referred to as a compressor/starter unit or any other suitable name. In the illustrated example, the compressor 200 is implemented as a centrifugal compressor or radial compressor. In other examples, the compressor 200 may be implemented as an axial compressor or a mixed-flow compressor. The compressor 200 includes an impeller 202 coupled to a first drive shaft 204. The impeller 202 is disposed within a housing 206 (e.g., a casing, a shroud, etc.) having a compressor inlet 208 (e.g., a first port), a compressor outlet 210 (e.g., a second port) and an auxiliary inlet 212 (e.g., a third port). The first drive shaft 204 is operatively coupled to an accessory gearbox that forms part of an aircraft engine (e.g., the aircraft engine 102 of FIG. 1). In one mode of operation, when the aircraft engine is operating (e.g., running), the engine, via the engine accessory gearbox, causes the first drive shaft 204 to rotate and thus causes the impeller 202 to rotate, which compresses air entering the compressor inlet 208 to a relatively higher pressure at the compressor outlet 210. In particular, the impeller 202 includes a plurality of blades 214 that spin or rotate the air, thereby increasing the velocity of the air. The air entering the compressor 200 (e.g., via the compressor inlet 208) is directed onto a first end 216 (e.g., a front) of the impeller 202 along an axis 218 about which the impeller 202 rotates. As illustrated, the impeller 202 has a conical shape. The air is rotated or spun to increase the velocity of the air. The air travels toward a second end 220 (e.g., a rear, a radial outer edge opposite of the first end 216) of the impeller 202 where the air is forced through a diffuser 222 adjacent the second end 220 and into a collector 224 (e.g., a plenum). As illustrated in FIG. 2, a first conduit 226 is fluidly coupled to the compressor inlet 208 to supply air, such as bleed air, to the compressor 200 and a second conduit 228 is fluidly coupled to the compressor outlet 210 to deliver the pressurized air to one or more systems of the aircraft that uses bleed air or other compressor air.

Figure 3:
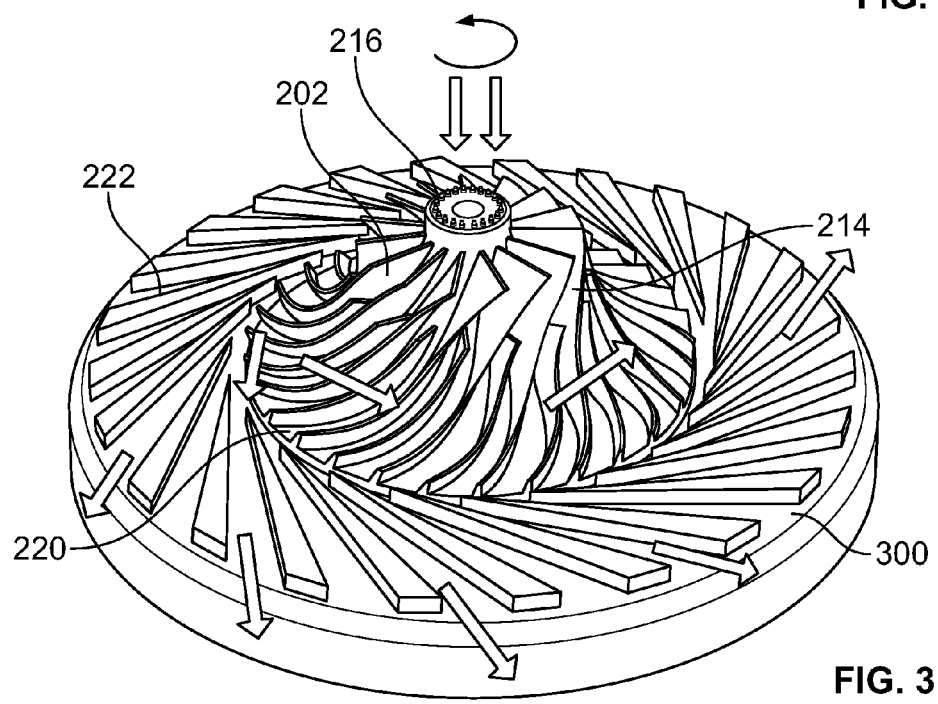
FIG. 3 is a perspective view of an example impeller and an example diffuser of the example compressor of FIG. 2 showing an example air flow path during the first operation.

FIG. 3 shows a perspective view of the impeller 202 and the diffuser 222 of the example compressor 200 of FIG. 2. As illustrated, the impeller 202 includes the plurality of blades 214 that are curved. When operating to compress air, the impeller 202 is rotated in the counter-clockwise direction looking from the first end 216, which causes air to be pulled into the blades 214. The impeller 202 rotates the air, thereby increasing the velocity of the air. The air is moved from the first end 216 of the impeller 202 to the second end 220 of the impeller 202 where the air is pushed through a plurality of vanes 300 and into or through the diffuser 222. The diffuser 222 gradually slows the velocity of the air, thereby increasing the pressure of the air. The air is discharged from the diffuser 222 into the collector 224 and out the compressor outlet 210 (e.g., adjacent the second end 220 of the impeller 202), as illustrated in FIG. 2.

Figure 4:
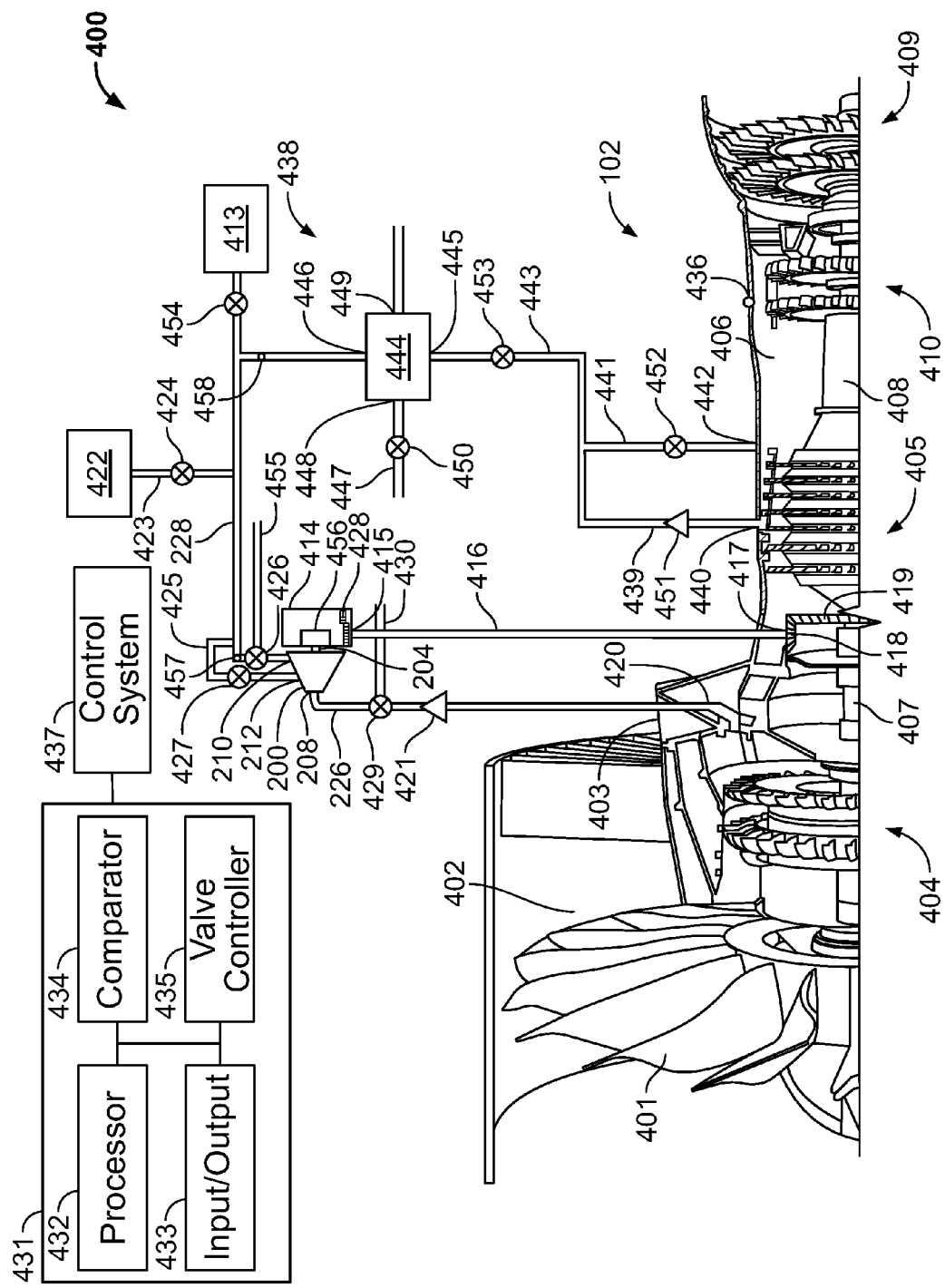
FIG. 4 illustrates an aircraft engine having an example bleed air and engine starter system that utilizes the example compressor of FIG. 2 to supply bleed air to aircraft systems and/or start the aircraft engine.

FIG. 4 shows a partial cutaway view of the aircraft engine 102 implemented with an example bleed air and engine starter system 400 in accordance with the teachings of this disclosure. The example bleed air and engine starter system 400 employs the example compressor 200 to start the engine 102 and/or to produce pressurized air for use by the various systems of the aircraft 100 (FIG. 1). In the illustrated example, the engine 102 is a gas turbine engine having a fan 401 that draws air into a fan duct or compressor intake section 402 and into a compressor 403. The compressor 403 may include multiple compressor sections. For example, the compressor 403 of the illustrated example is a dual-axial compressor that includes two compressors: a first compressor 404 and a second compressor 405. Additionally, each of the first and second compressors 404, 405 includes various compressor stages that progressively increase the pressure of the air as the air flows from the compressor intake section 402 to a combustion chamber 406. In the example shown, the first compressor 404 is a low-pressure compressor (LPC) that provides relatively low pressure air and the second compressor 405 is a high-pressure compressor (HPC) that provides relatively high pressure air. The compressors 404, 405 are operatively coupled to respective shafts 407, 408. The first shaft or LPC shaft 407 is operatively coupled to a low-pressure turbine 409 and the second shaft or HPC shaft 408 is operatively coupled to a high-pressure turbine 410. In this example, the compressor 403 is a dual-axial compressor that includes the two compressors 404, 405. However, in other examples, the compressor 403 may include more or fewer compressor sections, each having, for example, a turbine and a shaft operatively coupled to a respective turbine.

After exiting the HPC 405, the highly pressurized air is provided to the combustion chamber 406, where fuel is injected and mixed with the highly pressurized air and ignited. The high energy airflow exiting the combustion chamber 406 causes the turbines 409, 410 to rotate which rotates the compressors 404, 405 via the shafts 408,409, respectively. The heated air is exhausted via a nozzle where it mixes with cool air, provided by the fan 401 that bypasses the engine core.

In one mode of operation, the system 400 utilizes the compressor 200 to compress or pressurize air for a system 413. The system 413 may include, for example, an ECS, a wing anti-icing system, an engine anti-icing system and/or any other system of an aircraft that utilizes compressed or pressurized air. An ECS, for example, conditions the compressed air provided by the bleed air and engine starter system 400 to a cabin pressure and/or cabin temperature. The ECS may include, for example, one or more ECS packs (e.g., an air cycle refrigeration system) that receive the compressed air from the bleed air and engine starter system 400 and conditions or regulates the compressed air to generate ECS air that may be used to maintain cabin pressure and/or temperature, for example.

In the illustrated example, the compressor 200 is driven by the engine 102. More specifically, the compressor 200 is operatively coupled to a gearbox 414 via the first drive shaft 204, and the gearbox 414 is operatively coupled to a first end 415 of a second drive shaft 416 (e.g., a radial drive shaft). The second drive shaft 416 rotates to provide power to the gearbox 414 and, thus, to the compressor 200. In the illustrated example, a second end 417 of the second drive shaft 416 is operatively coupled to the engine 102. Specifically, the second end 417 of the second drive shaft 416 is coupled to a first gear 418. The first gear 418 is engaged with a second gear 419 that is operatively coupled to the HPC shaft 408. In the example shown, the first and second gears 418, 419 are bevel gears and are oriented substantially perpendicular to each other. As the HPC shaft 408 rotates about its longitudinal axis, the second gear 419, which is engaged with the first gear 418, rotates the first gear 418 and, thus, the second drive shaft 416 (e.g., about its longitudinal axis). The gearbox 414 drives the first drive shaft 204, which rotates the impeller 202 of the compressor 200. As a result, the compressor 200 provides relatively high pressure air to the conduit 228 that is fluidly coupled to the system 413.

In the illustrated example, the compressor 200 increases the pressure of bleed air that has been extracted from the LPC 404 (e.g., the final stage or discharge of the LPC 404).

In particular, the compressor inlet 208 is fluidly coupled to a bleed port 420 of the LPC 404. The conduit 226 fluidly couples the bleed port 420 of the LPC 404 and the compressor inlet 208. The compressor 200 compresses the bleed air extracted from the LPC 404 to provide a relatively higher pressure air at the compressor outlet 210, which is fluidly coupled to the system 413 via the conduit 228.

In the illustrated example, the system 400 operates by extracting lower-pressure bleed air from the bleed port 420 and compressing (e.g., boosting) the bleed air to a higher pressure to meet the demands of the system 413. Although in the illustrated example the compressor inlet 208 receives bleed air from a dedicated compressor stage (e.g., the discharge) of the LPC 404, the compressor inlet 208 may additionally or alternatively receive bleed air from another stage of the LPC 404 (e.g., a fourth stage, an eighth stage, etc.) and/or from another compressor stage of the HPC 405 (e.g., a second stage). Examples of such configurations are described in U.S. patent application Ser. No. 14/242,493, incorporated herein.

To prevent back flow pressure to the LPC 404, the system 400 of the illustrated example employs a check valve 421 (e.g., a back-flow preventer). The check valve 421 is disposed between the bleed port 420 of the LPC 404 and the compressor inlet 208 to prevent pressurized airflow toward the LPC 404 of the engine 102 when higher pressure bleed air is present in the conduit 226 downstream of the check valve 421. In other words, if the compressor 200 generates a back pressure at the compressor inlet 208 that is greater than the pressure of the bleed air extracted from the LPC 404, the check valve 421 prevents the back pressure from flowing into the LPC 404.

In some examples, the gearbox 414 is coupled (e.g., mounted) to an accessory or auxiliary gearbox of the engine 102. The accessory gearbox is driven by the engine 102, and the first drive shaft 204 may be coupled to an output of the accessory gearbox. In such an example, the gearbox 414 may be operatively coupled (e.g., via the accessory gearbox) to one or more other systems used in the aircraft 100 such as, for example, an electrical generator and/or a hydraulic pump. In the illustrated example, the second gear 419 is operatively coupled to the HPC shaft 408. However, in other examples the second gear 419 may be operatively coupled to and driven by the LPC drive shaft 407 or any other drive shaft of the engine 102. In some examples, the compressor 200 and/or the gearbox 414 of example shaft-driven compressor system 400 are disposed within the nacelle of the engine 102. In some such examples, the gearbox 414 is coupled (e.g., mounted) to the fan case and the compressor 200 and the gearbox 414 are disposed within the fan compartment. In other examples, the gearbox 414 is coupled to the core case of the engine 102 and the compressor 200 and gearbox 414 are disposed within the core compartment.

In the illustrated example, the first and second gears 418, 419 may be sized to enable the compressor 200 to boost a pressure of the bleed air extracted from the bleed air port 420 to a relatively higher pressure demanded by the system 413. In some examples, the compressor 200 boosts the bleed air from the LPC 404 by a factor of 2.5 to meet the demands of the system 413. In some examples, to account for varying inflow conditions (e.g., pressure fluctuations) and varying outflow demands, the compressor 200 includes variable geometry features such as variable inlet guide vanes and/or diffuser guide vanes to enable the compressor 200 to meet a range of inlet conditions and outlet demands. More particularly, in some examples, the guide vanes may be adjusted to achieve a higher or a lower air flow and/or pressure at the compressor outlet 210. In other examples, a vane-less diffuser or system having a ported shroud may be employed to account for varying inflow conditions and outflow demands.

In a second mode of operation, the example compressor 200 may be advantageously utilized to start the engine 102. In particular, the system 400 includes a high pressure air source 422 that is fluidly coupled to the compressor 200 to provide high pressure air to the compressor 200 to rotate the impeller 202 (FIG. 3), thereby rotating the first drive shaft 204 and, thus, the second drive shaft 416 coupled to the engine 102. The high pressure air source 422 may include, for example, high pressure air generated by an auxiliary power unit (APU), provided by a ground cart, or stored in an HP airflask onboard or remotely from the aircraft. In the illustrated example, the high pressure air source 422 provides high pressure air to the auxiliary inlet 212. The high pressure air source 422 is fluidly coupled to the conduit 228 via a conduit 423. In the illustrated example, a valve 424 is coupled to the conduit 423 that operates to direct high pressure air into the conduit 228. In the illustrated example, a conduct 425 fluidly couples the conduit 228 to the auxiliary inlet 212. A valve 426 is disposed within the conduit 228 between the compressor outlet 210 and the junction of the conduits 228, 425, and a valve 427 is coupled to the conduit 425 that operates to direct high pressure air to the auxiliary inlet 212. The valves 424, 426, 427 may be configured to regulate the pressure of high pressure air to a pre-set or predetermined pressure value and/or provide fluid flow shut-off (e.g., a pressure-reducing valve (PRV), a pressured-reducing shut off valve (PRSOV), a shut off valve (SOV), and/or a high pressure shut off valve (HPSOV)). In operation, to start the engine 102, the valves 424, 427 are moved to open positions and the valve 426 is moved to a closed position. The high pressure air from the high pressure air source 422 is directed through the conduit 228, through the conduit 425 and into the auxiliary inlet 212.

Figure 5:
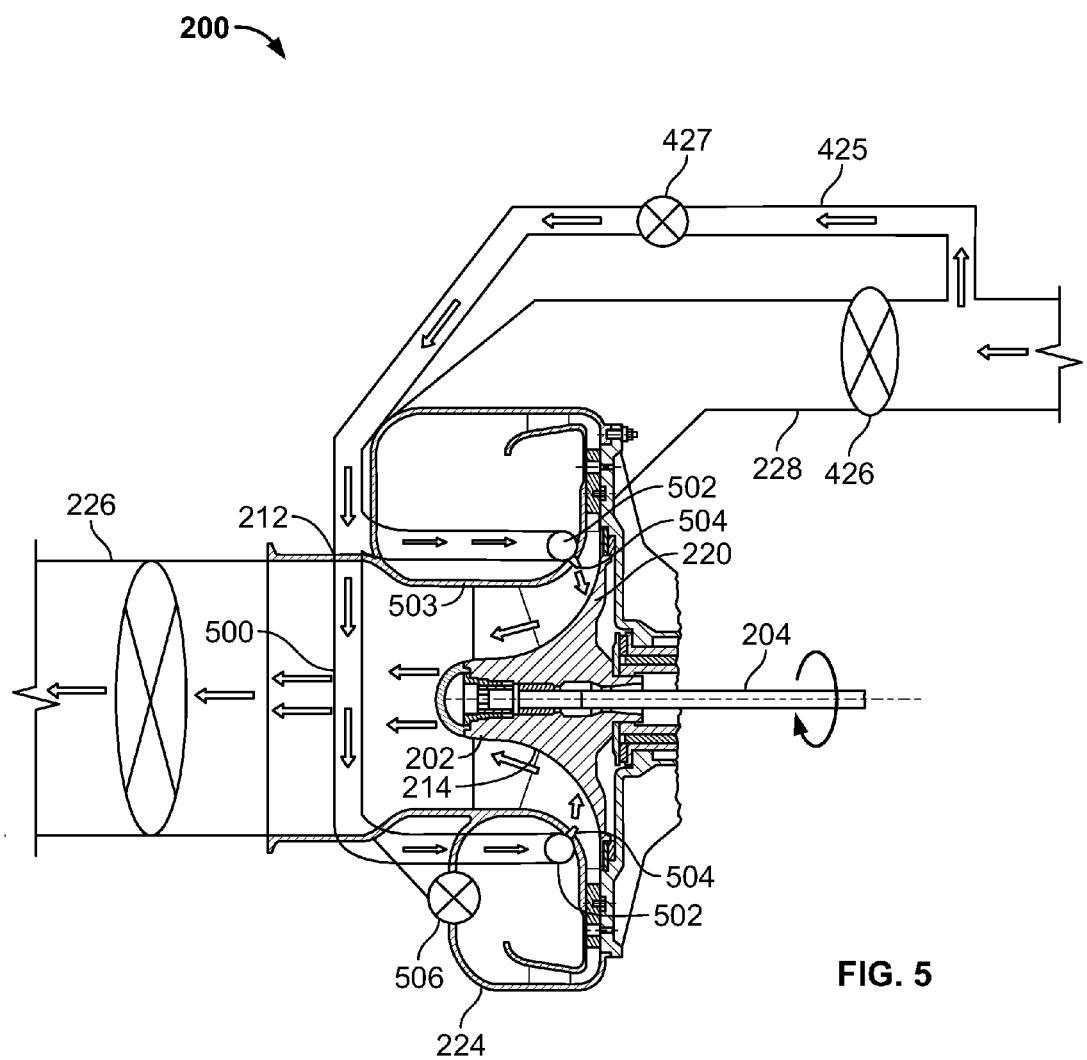
FIG. 5 is a cross-sectional view of the example compressor of FIG. 2 showing an example air flow path during a second operation in which high pressure air is supplied to the example compressor to generate power to start the aircraft engine.
Figure 6:
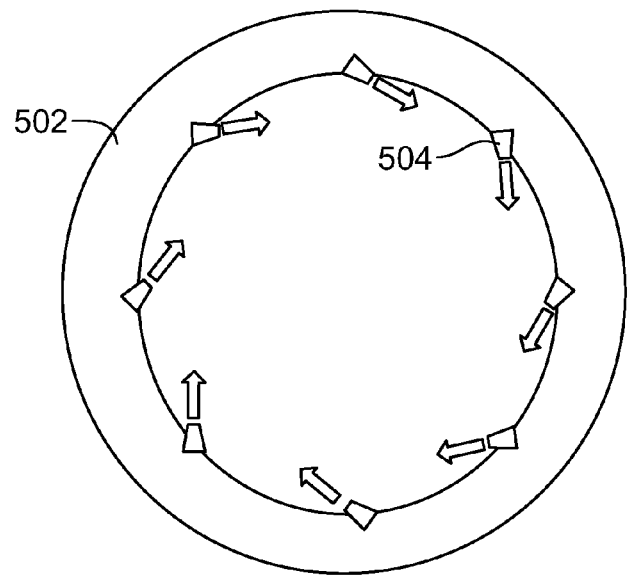
FIG. 6 shows an example manifold and example nozzles that may be implemented in the example compressor of FIG. 5 to direct high pressure air onto an example impeller of the compressor during the second operation.

FIG. 5 shows a cross-sectional view of the example compressor 200 receiving high pressure air during an engine start operation or mode. When the valve 426 is closed and the valve 427 is open, high pressure air is directed through the conduit 228, through the conduit 425 and into the compressor 200 through the auxiliary inlet 212. As illustrated in FIG. 5, the auxiliary inlet 212 is fluidly coupled to an auxiliary channel 500 that is fluidly coupled to a manifold 502. The manifold 502 encompasses or surrounds an inner surface or impeller cavity 503 defined by the housing 206. The manifold 502 includes a plurality of nozzles 504 (e.g., choked nozzles, vanes) that eject the high pressure air toward the impeller 202. In the illustrated example, the nozzles 504 are located on the inner surface 503 around the impeller 202 between the first and second ends 216, 220 of the impeller 202. The nozzles 504 direct the air onto the blades 214 at an optimal angle (e.g., a radial direction) to impinge on the blades 214, thereby causing the impeller 202 to rotate. FIG. 6 shows the manifold 502 and the plurality of nozzles 504 disposed around the manifold 502. As shown, the manifold 502 forms a ring that may surround the inner surface 503 of the compressor 200 to supply the high pressure air to the nozzles 504. The nozzles 504 are angled (e.g., are not directed at a center of the manifold 502) to direct the high pressure air to impinge on the blades 214 of the impeller 202 at an optimal angle (e.g., perpendicular to the blades 214). In some examples, the nozzles 504 increase the speed of the high pressure air to supersonic speed.

In the illustrated example, the high pressure air is directed onto the impeller 202 via the plurality of nozzles 504. In other examples, more or fewer nozzles may be implemented.

For example, only one nozzle (e.g., a port) may be used to direct high pressure air onto the impeller 202. Further, in the illustrated example the plurality of nozzles 504 are spaced equally apart from each other around the inner surface 503. However, in other examples, the nozzles 504 may be spaced differently.

Figure 7:
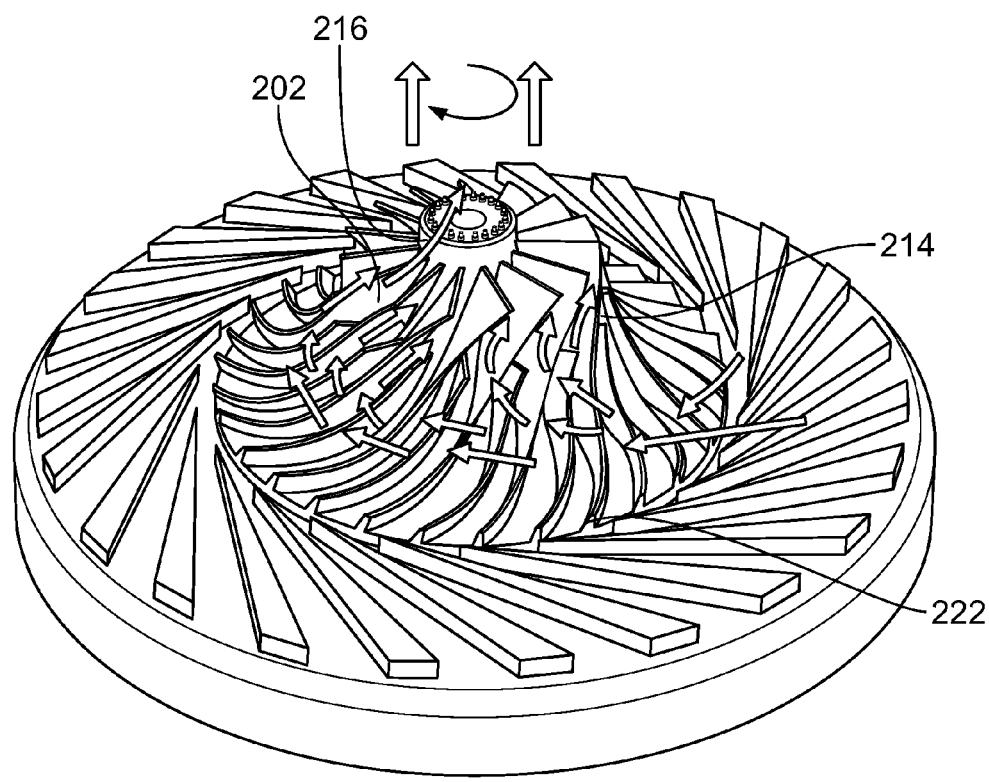
FIG. 7 is a perspective view of an example impeller and an example diffuser of the example compressor of FIG. 5 showing an example air flow path during the second operation.

FIG. 7 shows the impeller 202 and the diffuser 222 of the compressor 200. As illustrated by the flow arrows, the air is directed onto the blades 214 further up (e.g., more towards the first end 216) on the impeller 202 where the height of the blades 214 is relatively larger and the angle of the blades 214 is more optimal for generating turning force (e.g., more direct or perpendicular angle, along a radius of the impeller 202). As a result, the air contacts the blades 214 where more surface area is available and in a direction that generates more rotating force.

As shown in FIG. 5, when the compressor 200 is in the start mode, the impeller 202 is rotated in the clockwise direction, opposite to when the compressor 200 is operating to compressor air (as shown in FIG. 2). The rotation of the impeller 202 causes the first drive shaft 204 to rotate, which is operatively coupled to the gearbox 414 (FIG. 4). Referring to FIG. 4, the gearbox 414 includes a reverse gear 428 that is operable to enable the compressor 200 to rotate the engine 102 during the start mode or to enable the engine 102 to rotate the compressor 200 during the compressor mode. Therefore, when the reverse gear 428 is positioned to enable the compressor 200 to operate in the start mode, the driving power from the first drive shaft 204 drives the second drive shaft 416 and, thus, rotates the HPC shaft 408 of the engine 102. In some examples, the gearbox 414 is electrically controlled or operated and, thus, may be controlled remotely to engage or disengage the reverse gear 428 (e.g., to switch between a second operating mode in which the compressor 200 is used to start the engine 102 and a first operating mode in which the compressor 200 is used to pressurize air for the system 413). In other examples, other mechanisms such as a set of pawls may be used to reverse the rotating direction to supply driving power to the second drive shaft 416 in the correct direction. In the illustrated example, the HPC shaft 408 is rotated first, and then the LPC shaft 407 is rotated when the engine 102 starts. However, in other examples, the LPC shaft 407 may be rotated first. In other words, the second drive shaft 416 may instead be operatively coupled to the LPC shaft 407.

Once the HPC shaft 408 is spinning, fuel is mixed in the combustion chamber 406 and a spark is provided to ignite the mixture and start the engine 102. The high pressure air that is forced through the auxiliary inlet 212 exits the compressor inlet 208 and flows into the conduit 226. In some examples, a valve 429 is coupled to the conduit 226 between the bleed air port 420 and the compressor inlet 208. The valve 429 may direct the air through a conduit 430 to a downstream area. The valve 429 may be implemented as dump valve (e.g., a surge control valve, a three-way valve, a three-way pressure regulating valve) to dump the air overboard. Additionally or alternatively, as illustrated in FIG. 5, a dump or surge valve 506 may be coupled to the collector 224 of the compressor 200 dump surge pressure air and/or recirculate the air. In the illustrated example of FIG. 4, the high pressure air source 422 is fluidly coupled to the auxiliary inlet 212 via the conduit 228. In other examples, the high pressure air source 422 may be fluidly coupled directly to the auxiliary inlet 212 (e.g., and not through the conduit 228).

Once the engine 102 is started, the valves 424, 427 may be closed and the valves 426, 429 may be opened so the compressor 200 can supply pressurized air to the system 413. Thus, unlike known systems, the example bleed air and engine starter system 400 does not require additional ducting and/or a separate air turbine starter but, instead, advantageously utilizes the compressor 202 to start the engine 102.

In some examples, once the engine 102 is started, the high pressure air generated by the compressor 200 may be used to start the other engine 104 (FIG. 1) of the aircraft 100. For example, the system 413 may be implemented as a high pressure air source to start the other engine 104. Therefore, once the engine 102 is running, high pressure air may be generated by the example bleed air and engine starter system 400 and supplied to the other engine 104 to start the other engine 104. The pressurized air may be supplied to a shaft-driven compressor (e.g., similar to the compressor 200) of the other engine 104 to start the other engine 104 similar to the operations disclosed herein. As a result, an APU or ground cart is not needed to start the other engine.

Referring again to FIG. 4, in the illustrated example, the bleed air and engine starter system 400 employs a control system 431 to operate the valves 424, 426, 427, 429 and control the operations of the compressor 200, including in some embodiments, the reverse gear 428. The control system 431 of the illustrated example includes a processor 432, an input/output module 433, a comparator 434, and a valve controller 435. During an example engine startup operation (e.g., a second operation or mode), the valve controller 435 may operate to move the valve 426 to a closed position and the valves 424, 427 to an open position to provide high pressure air from the high pressure air source 422 to the auxiliary inlet 212. The high pressure air enters the auxiliary inlet 212 and impinges on the impeller 202 (FIG. 2) to rotate the impeller 202. The valve controller 435 may operate the valve 429 to direct the outlet air through the conduit 430 to a downstream area. The rotating power of the impeller 202 is transferred to the second drive shaft 416, which is transferred to the HPC shaft 408. Once the HPC shaft 408 is rotating, fuel is injected into the combustion chamber 406 and the mixture is ignited. The input/output module 433 may receive a signal from a sensor 436 indicating when the engine 102 is running or operating. Once the engine 102 is running, the system 400 may be switched to operate in a bleed air operation (e.g., a first operation or mode) to supply pressurized air to the system 413. For example, once the engine 102 is running, the valves 424, 427 may be closed, and the valves 426, 429 may be opened to supply pressurized air to the system 413. In some examples, the control system 431 may be part of a main control system 437 of the aircraft (e.g., a main control system that controls bleed air and engine starter systems of the engines of the aircraft).

In the illustrated example of FIG. 4, the system 400 includes an engine bleed air system 438 that may be used to supply pressurized bleed air to the system 413 in addition or alternative to the shaft-driven compressor 200. The engine bleed air system 438 includes a conduit 439 coupled to a first bleed port 440 (e.g., at an intermediate stage) of the HPC 405 and a conduit 441 coupled to a second bleed port 442 (e.g., at a discharge station) of the HPC 405. The second bleed port 442 is disposed downstream of the first bleed port 440. As a result, the pressure of the bleed air supplied at the second bleed port 442 is higher than the pressure of the bleed air supplied by the first bleed port 440. The conduits 439, 441 join together at a conduit 443 that is fluidly coupled to the system 413. Thus, the engine bleed air system 438 may supply bleed air from either the first bleed air port 440 and/or the second bleed air port 442 to the system 413 of the aircraft.

In some examples, the temperature of the bleed air supplied by the first and second bleed air ports 440, 442 of the HPC 405 is greater than a threshold temperature of the system 413. Therefore, prior to the system 413 receiving the bleed air from one or both of the bleed air ports 440, 442, the bleed air flows through a heat exchanger or precooler 444 to reduce the temperature of the bleed air. Specifically, the bleed air in the conduit 442 flows between a precooler inlet 445 and a precooler outlet 446. To cool the bleed air, the precooler 444 receives air provided by the fan 401 via a conduit 447. The fan air flows through the precooler 444 between an inlet 448 and an outlet 449. The cooler fan air flowing between the inlet 448 and the outlet 449 reduces the temperature of the bleed air flowing between the precooler inlet 445 and the precooler outlet 446. To control the temperature of the bleed air at the precooler outlet 446, a fan air modulating valve (FAMV) 450 is coupled to the conduit 447 and is disposed between the fan 401 and the inlet 448. The FAMV 450 varies the cooling fan airflow provided by the fan 401 and thereby controls the air temperature of the bleed air at the precooler outlet 446.

As shown in the illustrated example in FIG. 4, the system 413 can receive bleed air from either or both of the bleed air ports 440, 442. To prevent back flow pressure from entering the first bleed air port 440, the conduit 439 employs a check valve 451 (e.g., a back-flow preventer, an intermediate port check valve (IPCV)). The check valve 451 is coupled to the conduit 439 between the first bleed port 440 of the HPC 405 and the junction of the conduits 439, 441 to prevent pressurized bleed air from flowing toward the first bleed port 440 when higher pressure bleed air is present in the conduit 443.

In some examples, the pressure of the bleed air supplied by the bleed air ports 440, 442 of the HPC 405 is greater than a demand or threshold pressure of the system 413. Therefore, upstream from the system 413, one or more valves are employed to regulate the pressure supplied to the system 413. As shown in the illustrated example of FIG. 4, a valve 452 is disposed between the second bleed port 442 of the HPC 405 and the junction of the conduits 439, 441. The valve 452 may be configured, for example, to regulate the pressure of the bleed air supplied by the second bleed port 442 to a pre-set or predetermined pressure value prior to supplying the bleed air to the system 413 and/or the valve 452 may provide fluid flow shut-off (e.g., a PRV, a PRSOV, an SOV, an HPSOV). As also shown in the illustrated example of FIG. 4, a valve 453 is disposed between the junction of the conduits 439, 441 and the precooler inlet 445. The valve 453 may be configured, for example, to regulate the pressure of the bleed air to a pre-set or predetermined pressure value prior to the precooler 444 and/or provide fluid flow shut-off (e.g., a PRV, a PRSOV, an SOV, an HPSOV). In the illustrated example, a valve 454 is installed within the conduit 228 and disposed upstream from the system 413. The valve 454 may be configured to regulate the pressure of the bleed air to a pre-set or predetermined pressure value prior to supplying the bleed air to the system 413 and/or the valve 453 may provide fluid flow shut-off (e.g., a PRV, a PRSOV, an SOV and/or a HPSOV).

Depending on the operational state of the aircraft engine 102 (e.g., idle, take-off or climb, cruise, descent, etc.), the compressor 200 and/or the engine bleed air system 438 may be implemented to supply compressed air to the system 413. For example, during cruise conditions, the shaft-driven compressor 200 may be used to provide pressurized air to the system 413 (e.g., while minimizing waste of energy from the engine 102). In the illustrated example, the compressor 200 does not utilize a precooler or intercooler to reduce the temperature of the air. Instead, the shaft-driven compressor 200 extracts bleed air from a source of lower pressure (which is relatively cooler) and uses the power from the second drive shaft 416 to boost the pressure of the bleed air to an appropriate pressure for use in the system 413. Additionally, the first and second gears 418, 419 and/or the gearbox 414 may be configured to provide the appropriate amount of power and rotational speed to the compressor 200 to pressurize the bleed air to meet the pressure demands of the system 413. As a result, the compressor 200 does not waste energy by reducing the pressure of the bleed air. In other examples, the compressor 200 may employ a precooler to reduce the temperature of the bleed air.

During engine operating conditions other than cruise, such as during idle or descent, the pressurized air generated at the compressor outlet 210 may have insufficient pressure and/or temperature demanded by the system 413. For instance, the compressor 200 is operatively coupled to the engine 102 via a fixed gear ratio, and if the engine 102 is operating at a relatively low RPM, the compressor 200 may not be able to boost the bleed air from the LPC 404 to the desired pressure. Additionally or alternatively, during other operating conditions where higher pressure air is demanded (e.g., if a bleed air system from one engine is inoperable and/or only a single engine is operating), the compressor 200 may also not be able to supply a sufficient amount of compressed air. In such instances, the engine bleed air system 438 may be used to supplement the compressed air generated by the compressor 200 or as an alternative to the compressor 200 to provide higher pressure/temperature bleed air and/or additional bleed air to meet the demands of the system 413. Additionally, the engine bleed air system 438 functions as a safety, or redundant system. In other words, if the compressor 200 is inoperable, the engine bleed air system 438 may still function to provide compressed air to the system 413.

For example, bleed air may be extracted from the first bleed port 440. In such an example, the valve 452 is closed to shut off the flow of bleed air from the second bleed port 442 while the valve 453 and the valve 454 may be opened to supply pressurized air to the system 413. However, in some examples, the pressure of the bleed air may be too high, so the valve 453 and/or the valve 454 may be set to reduce the pressure of the bleed air prior to the system 413. Additionally or alternatively, the temperature of this bleed air may be too high and the precooler 444 may be utilized to reduce the temperature of the bleed air to a temperature suitable for use in the system 413.

At relatively lower engine thrust settings (e.g., at idle, during descent), bleed air from the first bleed port 440 of the HPC 405 may not be high enough to meet the demands of the system 413. Therefore, in some examples, bleed air may be extracted from the second bleed port 442 of the HPC 405. In such an example, the valves 452, 453, 454 are opened to supply relatively higher pressure bleed air to the system 413. However, the pressure of the bleed air supplied by the second port 442 may be too high. Therefore, one or more of the valves 452, 453, 454 may be set to reduce the pressure of the bleed air prior to the system 413. Additionally or alternatively, the temperature of the bleed air may be too high for use by the system 413. Therefore, the precooler 444 reduces the temperature of the bleed air. During cruise, which accounts for a majority of the flight time, the amount of wasted energy may be significant and result in a less efficient engine. Therefore, the example bleed air and engine starter system 400 of the illustrated example employs the compressor 200 to supply bleed air to the system 413, which reduces the amount of energy wasted by the engine bleed air system 438, thereby increasing fuel efficiency.

In the illustrated example, the valve 426 (e.g., a surge control valve, a three-way valve, a three-way pressure regulating valve) is disposed within the conduit 228 between the compressor outlet 210 and the system 413. The valve 426 operates to prevent the compressor 200 from stalling or surging. In some examples, because the compressor 200 is operatively coupled to the engine 102 via a fixed gear ratio, the compressor 200 may be operating and compressing bleed air at all times while the engine 102 is running. In some examples, when the engine 102 is operating at relatively lower speeds and the LPC 404 is not providing bleed air at a pressure that is sufficient to operate the system 413, the engine bleed air system 438 may be employed in addition to (e.g., to supplement) or alternative to the compressor 200. In some examples, the valve 426 may direct the compressed air from the compressor outlet 212 to a downstream area (e.g., to another system in the engine 102 or of the aircraft 100 (FIG. 1)). Similar to the air exiting the outlet 449 of the precooler 444, the compressed air may that is directed through the conduit 455 may be directed onto the turbines 409, 410 and/or the casing of the engine 102 to help cool the engine 102. Cooling the casing and/or the turbines 409, 410, for example, maintains a proper clearance or spacing between the turbines 409, 410 (e.g., or blades on the turbines 409, 410) and the casing (e.g., prevents shrinkage and/or expansion due to elevated temperatures). In other examples, the air exiting the outlet 449 of the precooler 444 and/or the air redirected by the valve 426 is discharged through a vent in the fuselage in a manner to produce thrust (i.e., thrust recovery). In some examples, when the engine 102 is operating at relatively high speeds and the compressor 200 is producing compressed air that has a pressured greater than that demanded by the system 413, the valve 426 may be employed to direct a portion of the excess air flow to or more of the uses disclosed above. In other words, some or all of the compressed air may be directed to the system 413 and/or the other locations disclosed above.

In some examples, a disconnect 456 (e.g., a quick disconnect or clutch) may be disposed between the first drive shaft 204 and the gearbox 414 to disconnect the compressor 200 from the gearbox 414 and, thus, from the engine 102. In some examples where one or more of the valves that are to supply air to or from the compressor 200 is inoperable, the compressor 200 may be disconnected from the drive train in the gearbox 414 (e.g., by a technician). In such an instance, the compressor 200 would not be operable during flight and would not produce excess bleed air.

The combination of the shaft-driven compressor 200 and the engine bleed air system 438 provides redundancy in the bleed air and engine starter system 400. For example, if the compressor 200 or the engine bleed air system 438 is inoperable, the other of the compressor 200 or the engine bleed air system 438 may be employed to supply compressed air to the system 413. For example, if the valve 426 fails to open or direct air to the conduit 228, bleed air may be supplied by the engine bleed air system 438. Specifically, the bleed air may be provided by the first bleed port 440 of the HPC 405. In such an instance, the valve 453 is opened and the valve 452 is closed.

The example control system 431 may be used to control the valves to supply compressed air to the system 413. For example, a sensor 457 downstream of the compressor outlet 212 may provide a signal (corresponding to the compressor 200 discharge pressure prior to flowing to the system 413) to the processor 432 via the input/output module 433. The control system 431 may determine if the downstream pressure measured by the sensor 457 is within a pre-determined pressure range (e.g., a threshold pressure, a pressure demand) for a given altitude, aircraft speed, passenger count, icing condition or any other condition affecting the operation of the aircraft system 413. For example, the comparator 434 may compare the signal provided by the sensor 457 with a pressure threshold or range provided, for example, by a reference table. For example, at cruise conditions, the valve 426 may be positioned or set so that the shaft-driven compressor 200 may provide bleed air to the system 413. If the pressure falls outside of the range (e.g., below the threshold pressure), the control system 431 may cause the valve 426 to divert the bleed air from the compressor outlet 212 to another system (e.g., to the low-pressure turbine 409 to cool the low-pressure turbine). Additionally or alternatively, the control system 431 may also cause the valve 452 and/or the valve 453 to open and provide pressurized bleed air to the system 413 within the predetermined pressure range. Thus, in some examples, the control system 431 causes the valves 426, 429, 452, 453, 454 to operate between an open and closed position to restrict fluid flow through the respective conduits or systems.

In another example, the engine bleed air system 438 of the illustrated example may employ a sensor 458 downstream from precooler outlet 446 to sense or detect the temperature of the bleed air prior to the system 413. The sensor 458 sends a signal corresponding to the temperature of the bleed air at the precooler outlet 446 to the control system 431. The control system 431 determines if the temperature value at the precooler outlet 446 is at or within a threshold value or range. For example, if the control system 431 determines (e.g., via the comparator 434) that the temperature of the bleed air is greater than a threshold temperature value, then the control system 431 instructs the valve controller 435 to command the FAMV 450 to allow more fan air flow into the inlet 448 of the precooler 444. If the temperature of the bleed air at the precooler outlet 446 is less than the threshold value, then the control system 431 commands the valve controller 435 to reduce the amount of fan air flowing to the inlet 448 of the precooler 444. In some examples, the fan air exiting the outlet 449 is dumped overboard. In other examples, the fan air exiting the outlet 449 of the precooler 444 may be routed for use in other systems of the aircraft 100.

While example manners of implementing the example bleed air and engine starter systems 400 and the example control system 431 are illustrated in FIG. 4, one or more of the elements, processes and/or devices illustrated in FIG. 4 may be combined, divided, re-arranged, omitted, eliminated and/or implemented in any other way. Further, the example processor 432, the example input/output module 433, the example comparator 434, the example valve controller 435, the example control system 436 and/or, more generally, the example control system 431 of FIG. 4 may be implemented by hardware, software, firmware and/or any combination of hardware, software and/or firmware. Thus, for example, any of the example processor 432, the example input/output module 433, the example comparator 434, the example valve controller 435, the example control system 437 and/or, more generally, the example control system 431 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 432, the example input/output module 433, the example comparator 434, the example valve controller 435, and/or the example control system 437 is/are hereby expressly defined to include a tangible computer readable storage device or storage disk such as a memory, a digital versatile disk (DVD), a compact disk (CD), a Blu-ray disk, etc. storing the software and/or firmware. Further still, the example bleed air and engine starter system 400 and/or the example control system 431 of FIG. 4 may include one or more elements, processes and/or devices in addition to, or instead of, those illustrated in FIG. 4, and/or may include more than one of any or all of the illustrated elements, processes and devices.

Figure 8:
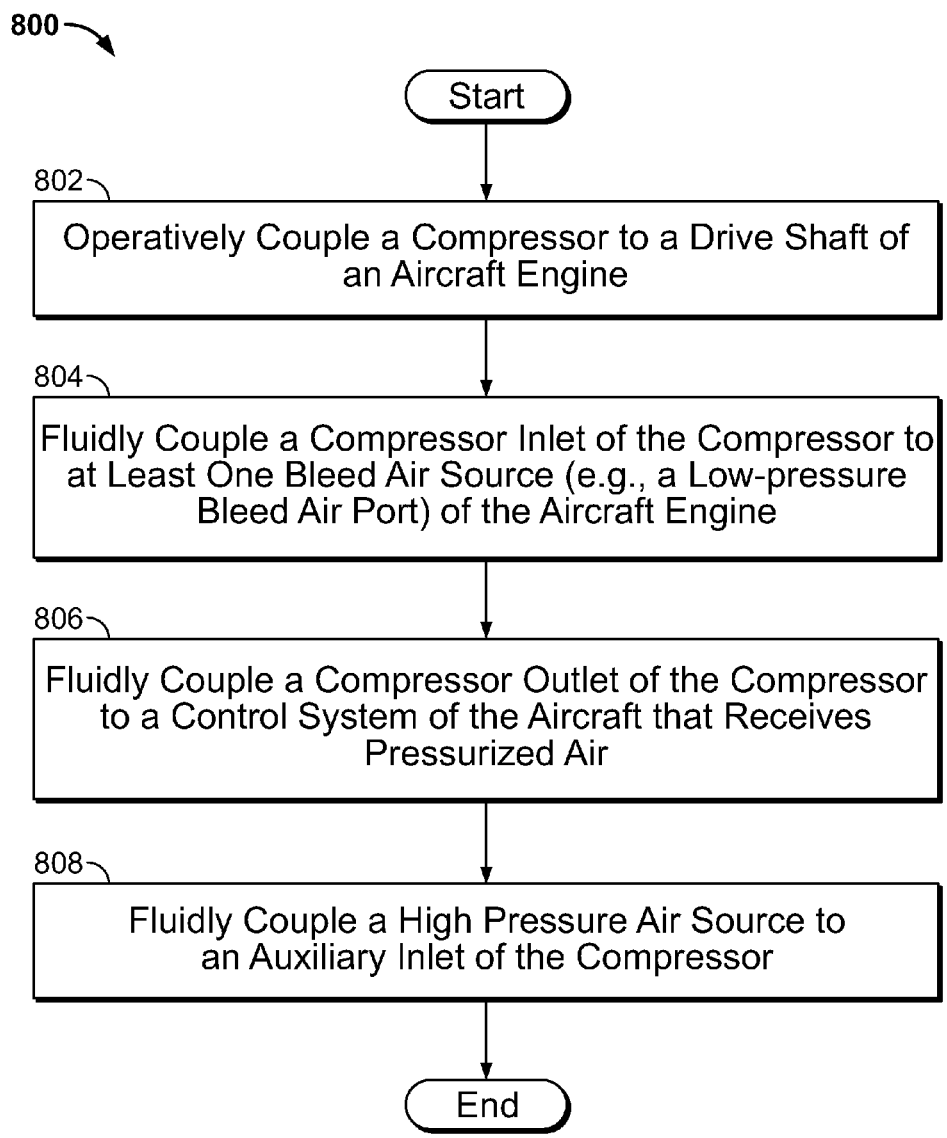
FIG. 8 is a flowchart representative of an example method of implementing the example bleed air and engine starter system of FIG. 4.
Figure 9A:
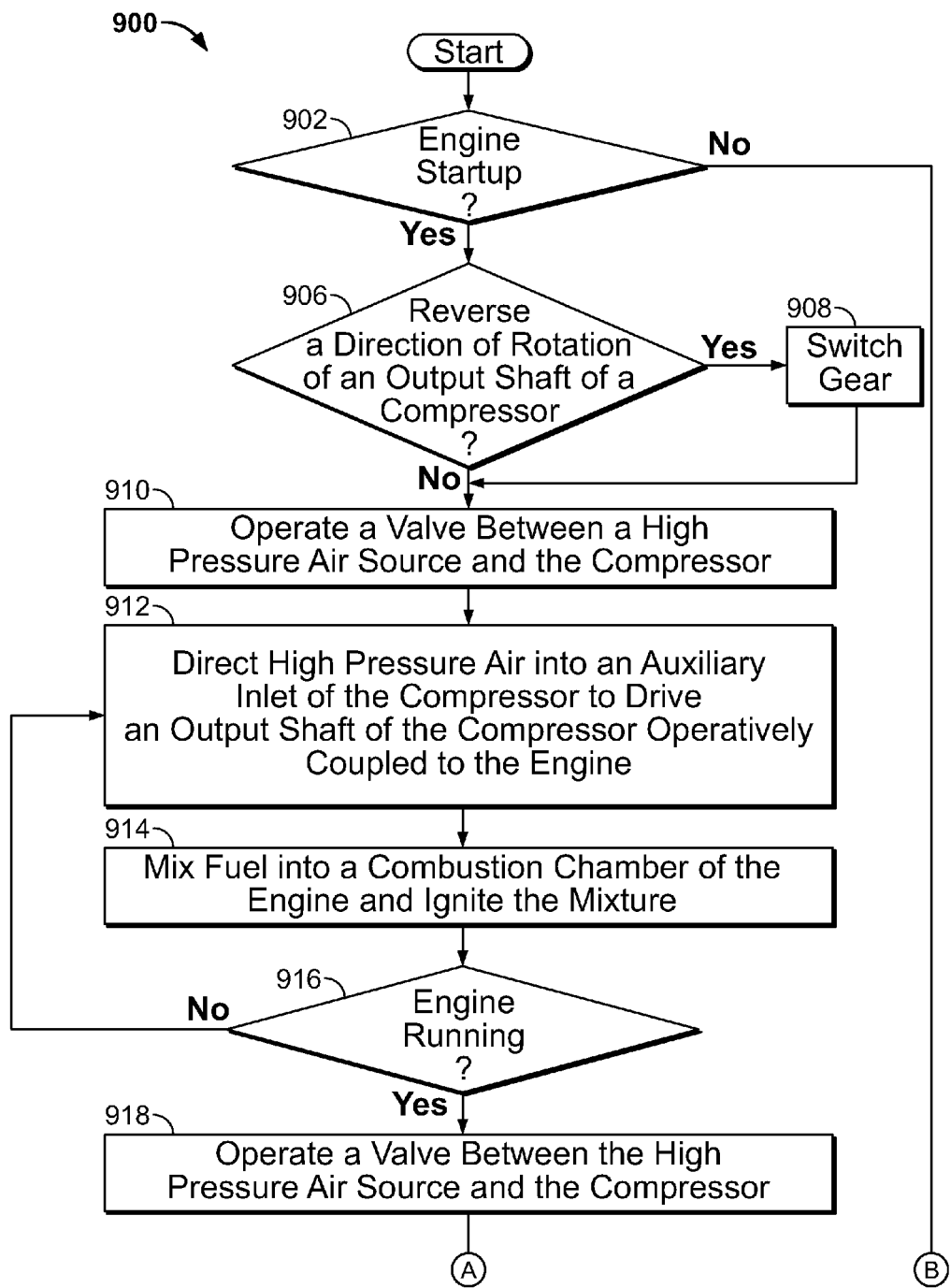
FIGS. 9A and 9B are a flowchart representative of an example method of starting an engine and supplying pressurized bleed air to a system of an aircraft that may be implemented by the example bleed air and engine starter system of FIG. 4.
Figure 9B:
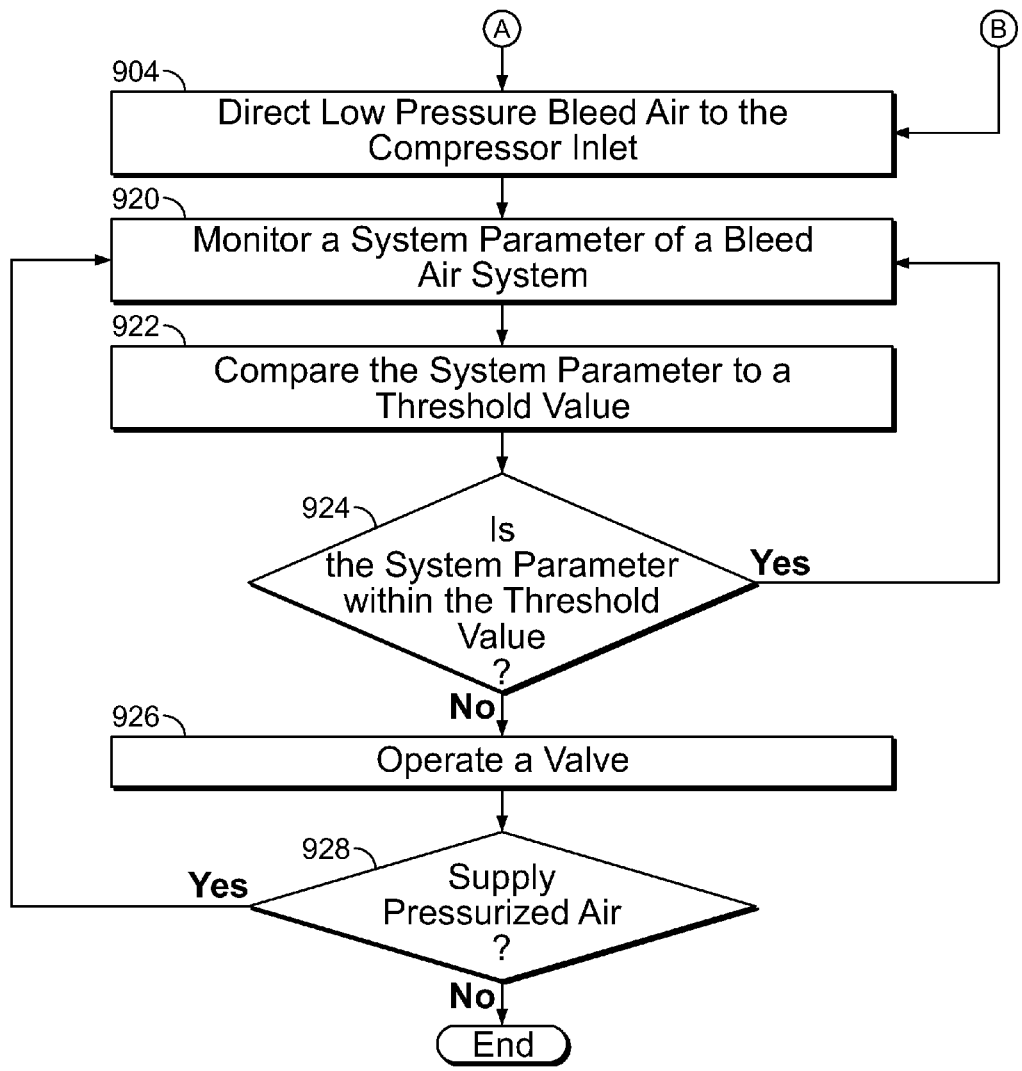

Flowcharts representative of example methods for implementing the example bleed air and engine starter system 400 and/or the example control system 431 of FIG. 4 are shown in FIGS. 8 and 9A and 9B. In these examples, the methods may be implemented by machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example methods are described with reference to the flowcharts illustrated in FIGS. 8 and 9A and 9B, many other methods of implementing the example bleed air and engine starter system 400 and/or the example control system 431 may alternatively be used. For example, the order of execution of the blocks may be changed, and/or some of the blocks described may be changed, eliminated, or combined.

As mentioned above, the example methods of FIGS. 8 and 9A and 9B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 8 and 9A and 9B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 is a flowchart representative of an example method 800 that may be used to implement the example bleed air and engine starter system 400 of FIG. 4 in accordance with the teachings of this disclosure. The example method 800 includes operatively coupling a compressor to a drive shaft of an aircraft engine (block 802). In some examples, the compressor is coupled to the drive shaft via one or more drive shafts and/or a gearbox. For example, as illustrated in the example bleed air and engine starter system 400, the compressor 200 is coupled to the gearbox 414 via the first drive shaft 204, and the gearbox 414 is coupled to the second drive shaft 416, which is coupled via the gears 418, 419 to the HPC shaft 408.

The example method 800 includes fluidly coupling a compressor inlet of the compressor to at least one bleed air source of the aircraft engine (block 804). For instance, the compressor inlet may be fluidly coupled to a bleed port on a low pressure compressor of the aircraft engine. For example, in the bleed air and engine starter system 400 of FIG. 4, the compressor inlet 208 is fluidly coupled via the conduit 226 to the bleed port 420 of the LPC 404. The example method 800 of FIG. 8 includes fluidly coupling a compressor outlet of the compressor to a control system of the aircraft that receives pressurized air (e.g., bleed air) (block 806). In the example bleed air and engine starter system 400 of FIG. 4, for example, the compressor outlet 210 is fluidly coupled, via the conduit 228, to the system 413. The system 413 may include, for example, an ECS, a wing anti-icing system, an engine anti-icing system and/or any other system of the aircraft that utilizes pressurized air (e.g., bleed air).

The example method 800 includes fluidly coupling a high pressure air source to an auxiliary inlet of the compressor (block 808). For example, as illustrated in the example bleed air and engine starter system 400 of FIG. 4, the high pressure air source 422 is fluidly coupled to the auxiliary inlet 212 of the compressor 200. The high pressure air source 422 supplies the high pressure air via the nozzles 504 to the blades 214 of the impeller 202. The nozzles 504 are oriented at an optimal angle to rotate the impeller 202.

FIGS. 9A and 9B show a flowchart representative of an example method 900 to start an aircraft engine with a compressor and/or supply pressurized air (e.g., bleed air) to a system of an aircraft that receives compressed air with the compressor. The example method 900 may be implemented by the example bleed air and engine starter system 400 of FIG. 4, for example. The example method 900 includes determining whether an engine of an aircraft is to be started (block 902). The control system 431 of FIG. 4 may determine if the engine 102 is to be started, for example. If the engine is already started and pressurized air is to be supplied to a control system of the aircraft, the example method 900 includes directing low pressure bleed air to a compressor inlet (block 904), which is described in further detail herein.

If an engine startup operation is to occur, the example method 900 includes determining whether to a reverse a direction of rotation of an output shaft of a compressor (block 906). For example, the control system 431 of FIG. 4 may determine if the first drive shaft 204 is rotated in a reverse direction during start such as, for example, where the impeller 202 is rotated in the clockwise direction. If the direction of rotation of the output shaft is to be reversed, the example method 900 includes switching to a gear (e.g., a reverse gear) to reverse the direction of rotation of the output shaft (block 908). For example, in the example system 400, the impeller 202 of the compressor 200 is rotated in a reverse direction during a start operation. The control system 431 may control a clutch and/or shifter in the gearbox 414 to switch to the reverse gear 428 to reverse the direction of rotation between the first drive shaft 204 and the second drive shaft 416, which is operatively coupled to the HPC shaft 408. In some examples, a set of pawls may be used to reverse the direction of rotation between the first drive shaft 204 and the second drive shaft 416.

The example method 900 includes operating a valve between a high pressure air source and the compressor (block 910). For example, as illustrated in the example bleed air and engine starter system 400 of FIG. 4, the valves 424, 427 are disposed between the high pressure air source 422 and the compressor 200. The valves 424, 427 may be operated by the control system 431. For example, the control system 431 may move the valves 424, 427 to an open position. Additionally, the valve 426 may be moved to a closed position to prevent high pressure air from flowing into the compressor outlet 210.

The example method 900 includes directing high pressure air into an auxiliary inlet of the compressor to drive an output shaft of the compressor (block 912). The compressor may be operatively coupled to a drive shaft of the aircraft engine. For example, in the example bleed air and engine starter system 400 of FIG. 4, the compressor 200 is operatively coupled to the HPC shaft 408 via the first and second drive shafts 204, 416. The valves 424, 427 may be moved to open positions to provide high pressure air to the auxiliary inlet 212 and the valve 426 may be moved to a closed position.

The example method 900 includes mixing fuel into a combustion chamber of the aircraft engine and igniting the mixture (block 914), such as the combustion chamber 406 of the example engine 102. The example method 900 includes determining if the engine is running or operating (block 916). The control system 431 of FIG. 4 may determine if the engine 102 is running via the sensor 436, for example. If the engine is not operating, the compressor may continue to drive the drive shaft of the engine while fuel is mixed and ignited in the combustion chamber (blocks 912, 914). If the engine is operating, the example method 900 includes operating a valve between the high pressure air source and the compressor (block 918). For example, once the engine 102 of FIG. 4 is operating, the valves 424, 427 may be moved to a close position. Additionally, the valves 426, 429 may be moved to an open position. The valves 424, 426, 427, 429 may be controlled by the control system 431. In some examples, if a reverse gear or other reverse mechanism was used to reverse the direction of rotation of the output shaft of the compressor (block 908), the method 900 may include switching to a gear to revert back to the original direction of rotation.

The example method 900 includes directing low pressure bleed air to the compressor inlet (block 904). For example, in the example bleed air and engine starter system 400, the conduit 226 provides bleed air from the LPC 404 to the compressor inlet 208. In some examples, the valve 429 is disposed in the conduit 226 and may be operated or controlled (e.g., via the control system 431) to regulate the bleed air provided to the compressor inlet 208.

The example method 900 includes monitoring a system parameter of a bleed air system (block 920). For example, the control system 431 of FIG. 4 may be configured to monitor one or more system parameters of the example bleed air and engine starter system 400 disclosed herein. To monitor a system parameter, the control system 431 receives one or more signals from sensors (e.g., the sensors 436, 457, 458) throughout the bleed air and engine starter system 400 and/or the control system 437. For example, a system parameter may include a pressure of bleed air, a temperature of the bleed air, a speed of the engine 102, an altitude of the aircraft, etc. The control system 431 receives the signals via the input/output module 433.

The example method 900 includes comparing the system parameter to a threshold value (block 922). For example, the control system 431 can compare, via the comparator 434, the pressure and/or temperature of the pressurized air or bleed air received via the sensors 436, 457, 458 to respective threshold values retrieved from a look-up table or storage or with the other values received by the sensors 436, 457, 458. In some examples, the system parameter and/or the threshold value may be based on other operating conditions of the aircraft. The example method 900 includes determining if the system parameter measured by, for example, the sensors, is within the threshold value (block 924). If the system parameter is within the threshold value, then the control system 431 returns to block 920 to continue monitoring the system parameter.

If the system parameter is not within the threshold value, the example method 900 includes operating a valve (block 926). For example, in the bleed air and engine starter system 400 of FIG. 4, if the pressure of the compressed air at the compressor outlet 210 is not substantially equal to (e.g., below) the pressure demanded by the system 413, the control system 431 may cause the valves 452, 453 to move to an open position to allow relatively higher pressure bleed air to be supplied to the system 413. The example method 900 includes determining whether pressurized air is to be further supplied (block 928). If the engine is off, or the aircraft is not in use, then the method 900 may end. Otherwise, if the aircraft is still in flight, for example, the method 900 may continue to monitor the system parameter of the bleed air system (block 920) and control the valves to supply pressurized air to the system(s) of the aircraft.

Figure 10:
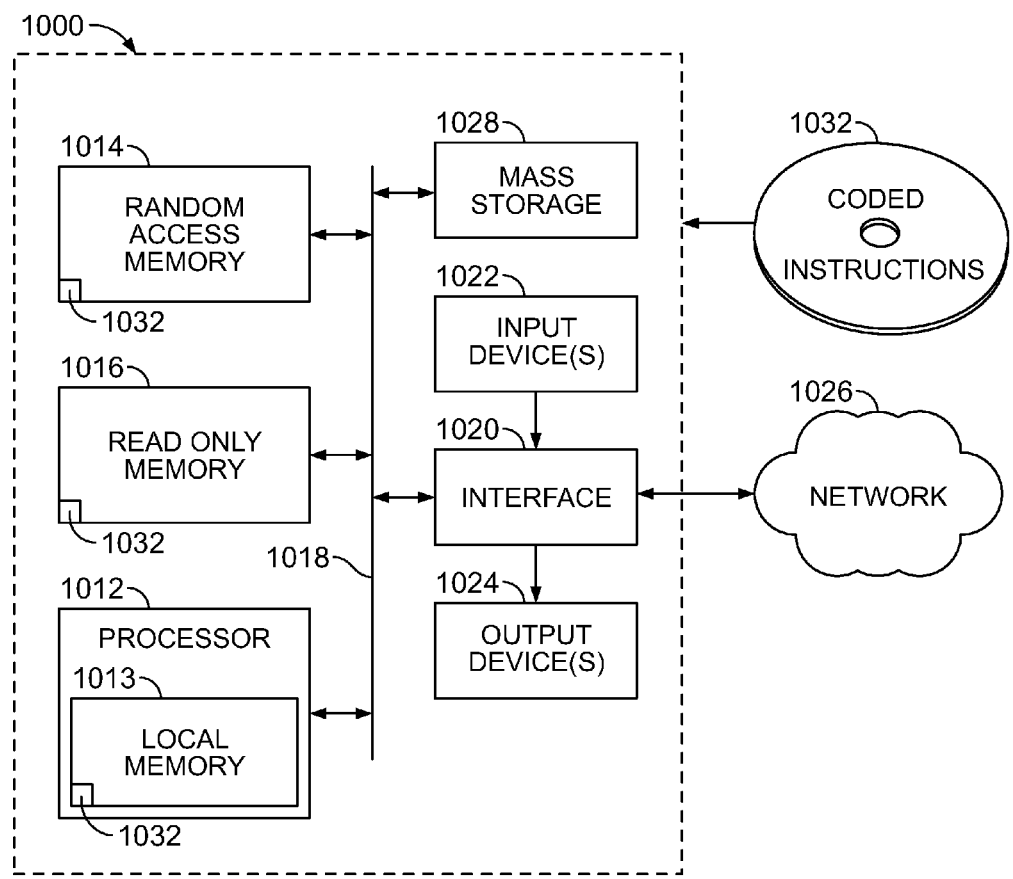
FIG. 10 is a diagram of a processor platform for use with the examples disclosed herein.

FIG. 10 is a block diagram of an example processor platform 1000 capable of executing the instructions to implement the example methods of FIGS. 8 and 9A and 9B and the example bleed air and engine starter system 400 of FIG. 4. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 representing the example methods 800 and 900 of FIGS. 8 and 9A and 9B may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture reduce the amount of ducting and equipment traditionally needed to provide bleed air to systems of an aircraft and to start an engine. The examples disclosed herein utilize a compressor that is operatively coupled to a shaft of an engine to compress bleed air for system(s) of the aircraft and/or for starting the engine. High pressure air may be provided to an auxiliary inlet port of the compressor to rotate an impeller, thereby driving a drive shaft of the engine. As a result, less ducting and/or other components are utilized by engine, thereby reducing the weight of the engine, and thus, increasing the efficiency of the aircraft. The example bleed air and engine starter systems also result in decreased costs compared to known engines having separate engine starting systems and bleed air systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A compressor comprising:
   a housing;
   an impeller disposed within a cavity of the housing, the impeller operatively coupled to a drive shaft;
   a first port in the housing oriented to provide air to the impeller when the impeller is operating in a first mode, wherein in the first mode the drive shaft is to rotate the impeller to draw the air from the first port and increase a pressure of the air; and
   a second port in the housing to direct air onto the impeller to rotate the impeller when the compressor is operating in a second mode, wherein in the second mode the impeller is to drive the drive shaft, wherein the second port includes a plurality of nozzles disposed around the cavity and oriented to direct air onto the impeller.

2. The compressor of claim 1, wherein the impeller has a first end and a second end opposite the first end, the second port positioned to direct air onto the impeller in a location between the first end and the second end of the impeller.

3. The compressor of claim 2, wherein the first port is positioned adjacent the first end of the impeller.

4. The compressor of claim 1 further including a manifold, the plurality of nozzles fluidly coupled to the manifold.

5. The compressor of claim 1, wherein the first port is aligned with a rotational axis of the impeller.

6. The compressor of claim 1, wherein the impeller is to rotate in one direction when the compressor is operating in the first mode and the impeller is to rotate in an opposite direction when the compressor is operating in the second mode.

7. A compressor comprising:
   a housing;
   an impeller disposed within a cavity of the housing, the impeller operatively coupled to a drive shaft;
   a first port in the housing oriented to provide air to the impeller when the impeller is operating in a first mode, wherein in the first mode the drive shaft is to rotate the impeller to draw the air from the first port and increase a pressure of the air; and
   a second port in the housing to direct air onto the impeller to rotate the impeller when the compressor is operating in a second mode, wherein in the second mode the impeller is to drive the drive shaft, wherein the drive shaft is a drive shaft of an aircraft engine, and wherein the impeller is operatively coupled to the drive shaft of the aircraft engine during the first mode and the second mode.

8. An apparatus comprising:
   a compressor having a compressor inlet and a compressor outlet, the compressor operatively coupled to an engine of an aircraft via a drive shaft;
   a first conduit to fluidly couple a low-pressure bleed air port from the engine to the compressor inlet;
   a second conduit to fluidly couple the compressor outlet to a system of the aircraft to receive pressurized air; and
   a third conduit to fluidly couple a high pressure air source to the compressor, wherein the compressor is to be driven by the drive shaft during a first operation, and the compressor is to drive the drive shaft during a second operation.

9. The apparatus of claim 8, wherein the third conduit is fluidly coupled to a nozzle disposed within a cavity of the compressor, the nozzle located between the compressor inlet and the compressor outlet.

10. The apparatus of claim 8, wherein the compressor includes an impeller, and wherein the impeller is to rotate in one direction during the first operation and in the opposite direction during the second operation.

11. The apparatus of claim 8, wherein the first operation occurs when the aircraft is operating at cruise and the second operation is an engine startup operation.

12. The apparatus of claim 8 further including a reverse gear operatively coupled between the compressor and the drive shaft, the reverse gear to reverse a direction of rotation supplied to the drive shaft by the compressor during the second operation.

13. The apparatus of claim 8 further including a valve disposed in the third conduit, the valve to be in a closed position during the first operation.

14. A method comprising:
  directing low pressure air into a compressor inlet of a compressor during a first operation, the compressor having an impeller in a housing, the impeller operatively coupled to an aircraft engine via a drive shaft, the impeller to be driven by the aircraft engine during the first operation to increase a pressure of the low pressure air to a higher pressure at a compressor outlet of the compressor; and
  directing high pressure air into the compressor to rotate the impeller during a second operation.

15. The method of claim 14, wherein the impeller rotates in one direction during the first operation and in an opposite direction during the second operation.

16. The method of claim 14, wherein the compressor includes a plurality of nozzles disposed around the impeller between the compressor inlet and the compressor outlet.

17. The method of claim 16, wherein the high pressure air is to be directed through the nozzles and onto blades of the impeller to rotate the impeller during the second operation.

18. The method of claim 14, wherein the second operation is an engine startup operation.

19. The method of claim 18, wherein the first operation occurs when the aircraft engine is operating at a cruise speed.

* * * * *